United States Patent
Haruna et al.

(10) Patent No.: US 8,192,871 B2
(45) Date of Patent: Jun. 5, 2012

(54) LITHIUM SECONDARY BATTERY AND PRODUCTION METHOD OF THE SAME

(75) Inventors: Hiroshi Haruna, Fukaya (JP); Kazushige Kohno, Hitachi (JP); Eiji Seki, Hitachi (JP); Yoshiaki Kumashiro, Mito (JP)

(73) Assignee: Hitachi, Ltd., Tokyo (JP)

( * ) Notice: Subject to any disclaimer, the term of this patent is extended or adjusted under 35 U.S.C. 154(b) by 584 days.

(21) Appl. No.: 12/388,580

(22) Filed: Feb. 19, 2009

(65) Prior Publication Data

US 2009/0263721 A1    Oct. 22, 2009

(30) Foreign Application Priority Data

Mar. 10, 2008   (JP) .................... 2008-059873

(51) Int. Cl.
*H01M 4/13*   (2010.01)
(52) U.S. Cl. ............. 429/231.8; 429/231.95; 429/330; 429/338
(58) Field of Classification Search ............ 429/231.8, 429/231.95, 330, 332, 338, 342; 29/623.2
See application file for complete search history.

(56) References Cited

U.S. PATENT DOCUMENTS

| | | | |
|---|---|---|---|
| 6,482,550 B1 * | 11/2002 | Imachi et al. ............ | 429/338 |
| 7,875,395 B2 * | 1/2011 | Kozono et al. .......... | 429/409 |
| 2003/0165733 A1 * | 9/2003 | Takehara et al. ........ | 429/101 |
| 2004/0106047 A1 * | 6/2004 | Mie et al. ............... | 429/324 |
| 2004/0137333 A1 * | 7/2004 | Nishiyama et al. ...... | 429/330 |
| 2005/0019656 A1 * | 1/2005 | Yoon et al. ............. | 429/217 |
| 2006/0172201 A1 * | 8/2006 | Yasukawa et al. ....... | 429/329 |
| 2007/0092802 A1 * | 4/2007 | Ahn et al. .............. | 429/326 |
| 2007/0196740 A1 * | 8/2007 | Haruna et al. .......... | 429/326 |
| 2008/0038637 A1 * | 2/2008 | Minami et al. .......... | 429/231.3 |

FOREIGN PATENT DOCUMENTS

JP   2000-306602   11/2000

(Continued)

OTHER PUBLICATIONS

Machine translation of JP 2000/306602; Feb. 2000.*
Machine translation of JP 2005/108476; Apr. 2005.*
JP Office Action of Appln. No. 2008-059873 dated Aug. 10, 2010 with English translation.

(Continued)

*Primary Examiner* — Helene Klemanski
(74) *Attorney, Agent, or Firm* — Antonelli, Terry, Stout & Kraus, LLP.

(57) ABSTRACT

To provide a lithium secondary battery which suppresses a decrease in the charge and discharge efficiency during a battery storage test and which is excellent in maintaining the battery capacity after the storage test. There are disclosed a nonaqueous lithium battery, comprising: a positive electrode active material comprising a lithium-containing oxide capable of inserting and detaching lithium ions; a negative electrode active material comprising a carbon material capable of inserting and detaching lithium ions; and an electrolytic solution containing a lithium ion, wherein the surface of the negative electrode active material after initializing charging is coated with a compound derived from vinylene carbonate, and wherein a weight power density of the lithium battery is no less than 100 Wh/kg, and a method of producing a nonaqueous lithium battery comprising a step of sealing a positive electrode active material, a negative electrode active material, and a nonaqueous electrolytic solution using a sealed container, wherein a predetermined amount of vinylene carbonate is added into the nonaqueous electrolytic solution, and the initializing charging is carried out to form a coating on the surface of the negative electrode active material, the coating being derived from the vinylene carbonate.

13 Claims, 1 Drawing Sheet

FOREIGN PATENT DOCUMENTS

| | | |
|---|---|---|
| JP | 2001-057234 | 2/2001 |
| JP | 2001-313009 | 11/2001 |
| JP | 2002-324580 | 11/2002 |
| JP | 2002-352852 | 12/2002 |
| JP | 2004-22174 | 1/2004 |
| JP | 2004-154352 | 6/2004 |
| JP | 2005-100851 | 4/2005 |
| JP | 2005-108476 | 4/2005 |
| JP | 2005-259381 | 9/2005 |

OTHER PUBLICATIONS

Zhang et al. "Electrochemical and Infrared Studies of the Reduction of Organic Carbonates", Journal of the Electrochemical Society, 148 (12) A1341-A1345 (Nov. 2001).

Decision on Rejection of Japanese Appln. 2008-059873 issued Sep. 7, 2011.

* cited by examiner

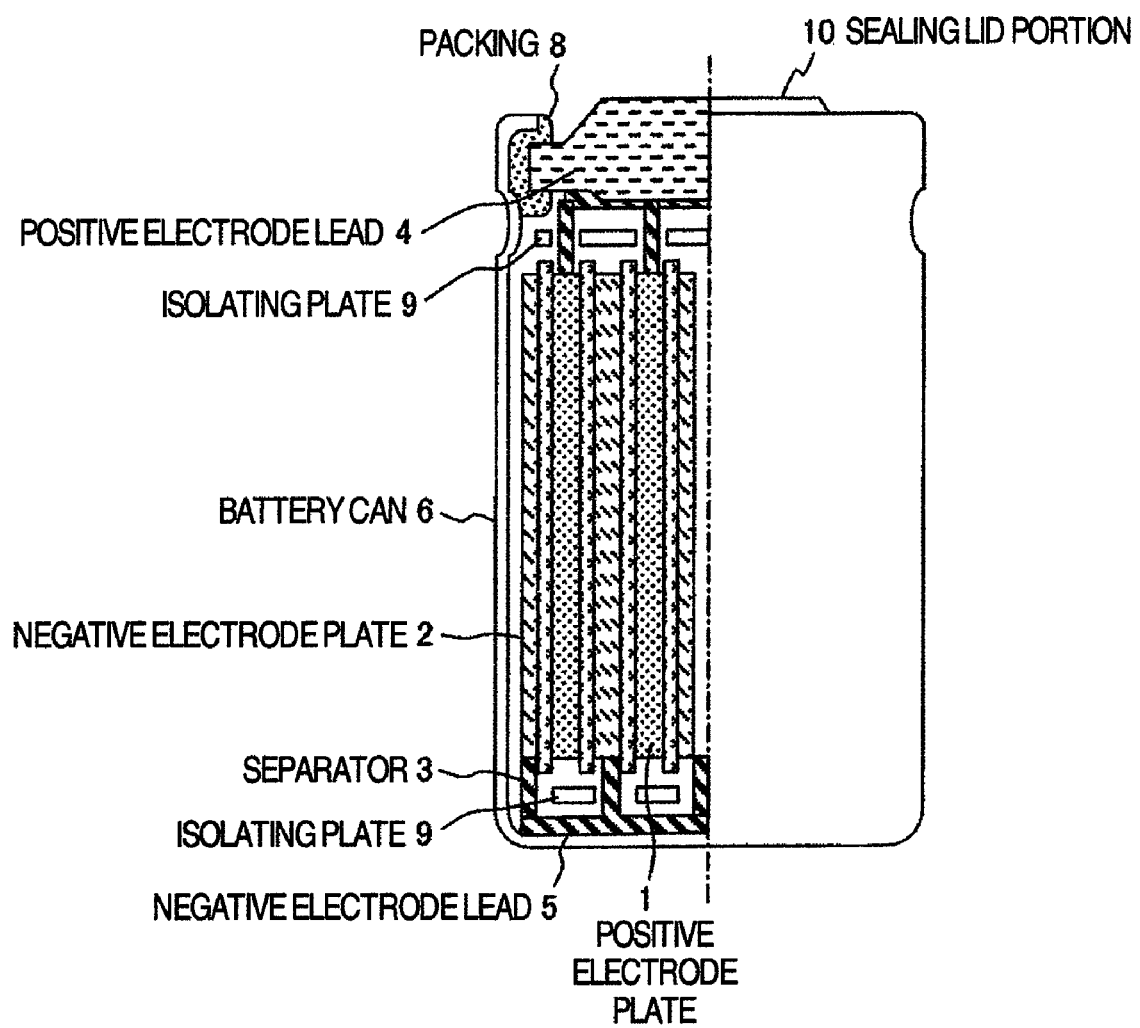

LITHIUM SECONDARY BATTERY AND PRODUCTION METHOD OF THE SAME

FIELD OF THE INVENTION

The present invention relates to a lithium secondary battery capable of achieving a long life, and a production method of the same.

BACKGROUND OF THE INVENTION

For the power supplies used for mobile communications, such as a mobile phone and a portable personal computer, in recent years, demand for further miniaturization and higher power density has been ever increasing, while a power supply system for midnight power storage and a power storage type power supply system in combination with a solar battery or a wind power generation are also under development. Practical utilization of an electric vehicle, and a hybrid vehicle or hybrid train utilizing the electric power as a part of the engine are currently underway.

However, if a carbon material, a silicon-based material, a metal oxide, and the like are used as the negative electrode material of nonaqueous electrolytic solution lithium secondary battery, then an organic solvent, which is an electrolytic solution, is reduced and decomposed on the surface of a negative electrode in the charge and discharge process. As a result, the negative electrode impedance will increase with time due to the gas generation or the deposition or the like of a reductive decomposition product of the organic solvent, thereby causing a problem of a decrease in the battery capacity.

Then, conventionally, for the purpose of suppressing the reductive decomposition of the organic solvent, various kinds of compounds are added into the electrolytic solution to suppress the reductive decomposition of the organic solvent on the negative electrode, and thus a technique to control the morphology of the surface coating of the negative electrode is becoming important.

Patent Document 1 discloses a lithium battery using a nonaqueous electrolytic solution into which cyclic carbonate and/or chain carbonate, and divinyl carbonate or vinyl ethylene carbonate are added. This technique is aimed at improving the high temperature storage characteristics of the lithium battery.

Patent Document 2 discloses a lithium battery using an electrolytic solution into which vinylene carbonate and γ-butyrolactone are added in a specific range. Patent Document 2 states this technique can achieve a reduction in the initial charge time.

Patent Documents 3 and 4 disclose a lithium battery using an electrolytic solution into which vinylene carbonate and 2,4-difluoroanisole are added. Patent Documents 3 and 4 state this technique can reduce the bulge during charge storage and extend the charging and discharging cycle life.

[Patent Document 1] JP-A-2001-057234
[Patent Document 2] JP-A-2004-154352
[Patent Document 3] JP-A-2005-100851
[Patent Document 4] JP-A-2005-259381
[Non-Patent Document 1] Journal of the Electrochemical Society, 148 (12) A1341-A1345 (2001)

BRIEF SUMMARY OF THE INVENTION

It is an object of the present invention to provide a lithium secondary battery which suppresses a decrease in the charge and discharge efficiency during a battery storage test and which is excellent in maintaining the battery capacity after the storage test.

The present invention provides a nonaqueous lithium battery comprising:
a positive electrode active material comprising a lithium-containing oxide capable of inserting and detaching lithium ions;
a negative electrode active material comprising a carbon material capable of inserting and detaching lithium ions; and
a nonaqueous electrolytic solution containing lithium ions,
wherein the surface of the negative electrode active material, after charging, is coated with a compound derived from vinylene carbonate.

Moreover, the present invention provides a nonaqueous lithium battery comprising:
a positive electrode active material comprising a lithium-containing oxide capable of inserting and detaching lithium ions;
a negative electrode active material comprising a carbon material capable of inserting and detaching lithium ions; and
a nonaqueous electrolytic solution containing lithium ions,
wherein the surface of the negative electrode active material, after charging, is coated with a compound derived from a mixture of vinylene carbonate, and an organic compound comprising one or more carboxylic anhydride groups selected from a group consisting of a chain or cyclic carbonate compound, an ester compound, an ether compound, and a compound having functional groups with other functional group substituent, the functional groups constituting the abobe-described compounds.

According to the present invention, a lithium battery having a weight power density of not less than 100 Wh/kg and having a long life can be provided employing the above-described configuration of the lithium battery.

It is preferable that the organic compound comprising the carboxylic anhydride group has a molecular structure asymmetrical with respect to the symmetric axis 1 in Formula (1), wherein $R_1$ and $R_2$ in Formula (1) may couple with each other to form a ring and are organic groups whose carbon number is in a range of 1 to 20, and $R_1$ and $R_2$ in Formula (1) further contain at least one of hydrogen, sulfur, oxygen, nitrogen, fluorine, chlorine, bromine, and iodine.

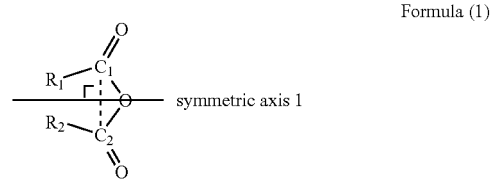

Formula (1)

The present invention further provides a method of producing a nonaqueous lithium battery comprising a step of sealing a positive electrode active material comprising a lithium-containing oxide capable of inserting and detaching lithium ions, a negative electrode active material comprising a carbon material capable of inserting and detaching lithium ions, and a nonaqueous electrolytic solution containing lithium ions, using a sealed container, wherein a predetermined amount of vinylene carbonate having an asymmetrical molecular structure is added into the nonaqueous electrolytic solution, and the initializing charging is carried out to form a coating on the surface of the negative electrode active material, the coating being derived from the vinylene carbonate.

Furthermore, the present invention provides a method of producing a nonaqueous lithium battery comprising a step of sealing a positive electrode active material comprising a lithium-containing oxide capable of inserting and detaching lithium ions, a negative electrode active material comprising a carbon material capable of inserting and detaching lithium ions, and a nonaqueous electrolytic solution containing lithium ions, using a sealed container, wherein a predetermined amount of vinylene carbonate, and one or more compounds selected from the group consisting of a chain or cyclic carbonate compound, an ester compound, an ether compound, and a compound having functional groups with other functional group substituent, the functional groups constituting the abobe-described compounds, are added into the nonaqueous electrolytic solution, and then initializing charging is carried out to form a coating on the surface of the negative electrode active material, the coating being derived from a mixture of the vinylene carbonate and the compound.

BRIEF DESCRIPTION OF THE DRAWINGS

FIG. 1 is a cross sectional view showing an outline of a battery described in Example 8.

DESCRIPTION OF REFERENCE NUMERALS

1 . . . positive electrode plate, 2 . . . negative electrode plate, 3 . . . separator, 4 . . . positive electrode lead, 5 . . . negative electrode lead, 6 . . . battery can, 8 . . . packing, 9 . . . insulating plate, 10 . . . sealing lid portion

DETAILED DESCRIPTION OF THE INVENTION

After intensive study, the present inventors found that when a lithium-containing oxide capable of inserting and detaching lithium ions is used as the positive electrode, a carbon material capable of inserting and detaching lithium ions is used as the negative electrode, and an electrolytic solution, into which a compound having vinylene carbonate in a predetermined amount range is dissolved, is applied to the lithium nonaqueous electrolytic solution, then the lithium battery has excellent capacity retention in a storage test, resulting in the present invention.

When the battery capacity is not greater than 10 Ah and the power density is not greater than 110 Wh/kg, the additive amount of the vinylene carbonate is preferably in a range of 0.3-0.6 g/100 g (electrolytic solution mass). Moreover, in the case of a high capacity lithium battery, for example, when the battery capacity is 100 Ah and the power density is not less than 115 Wh/kg, the additive amount of the vinylene carbonate is preferably in a range of 3-6 g/100 g (electrolytic solution).

In Patent Document 1, an additive amount y of vinylene carbonate (vol %) is given by $0.1 \leq y/S \leq 1$ (g·vol/m$^2$), where a specific surface area of the negative electrode active material is S (m$^2$/g). In the present invention, the specific surface area of the negative electrode active material is in a range of 0.0058 to 0.115 (g/m2). In this calculation, the amount of the electrolytic solution is 1.6 g, the amount of additive is in a range of 0.5-1.0 wt % (0.008-0.0016 g), the amount of the negative electrode active material is 1.13 g, the amount of the negative electrode conductive material is 0.02 g, the specific surface area (X) of the negative electrode active material is 1.0 (m$^2$/g), and the specific surface area of the negative electrode conductive material is 13.0 (m$^2$/g).

In the case where the battery capacity of a lithium battery is set less than or equal to 8 Ah, when the amount of the negative electrode active material is denoted as A, the amount of the negative electrode conductive material as B, the specific surface area of the negative electrode active material as X (m$^2$/g), and the specific surface area of the negative electrode conductive material as Y (m$^2$/g), a target lithium battery can be produced employing a range calculated from the following equation for the additive amount C (g/m$^2$) of vinylene carbonate. This is just an example, and the present invention is not limited to this range.

$$0.0058 \leq \frac{C(g)}{(A \cdot X + B \cdot Y)(m^2)} \leq 0.0115 \qquad \text{Equation 1}$$

It is preferable that the organic compound comprising the carboxylic anhydride group has a molecular structure asymmetrical with respect to the symmetric axis 1 in Formula (1), wherein $R_1$ and $R_2$ in Formula (1) may couple with each other to form a ring and are organic groups whose carbon number is in a range of 1 to 20, and $R_1$ and $R_2$ in Formula (1) contain at least one of hydrogen, sulfur, oxygen, nitrogen, fluorine, chlorine, bromine, and iodine.

Furthermore, according to the present invention, the capacity retention in the storage test can be improved also by adding a carboxylic anhydride compound into the electrolytic solution along with vinylene carbonate.

The carboxylic anhydride compound is represented by Formula (1), wherein $R_1$ and $R_2$ in Formula (1) are organic groups whose carbon numbers differ from each other in a range of 1 to 20, wherein $R_1$ and $R_2$ are carboxylic anhydride organic compounds containing at least one of hydrogen, sulfur, oxygen, nitrogen, fluorine, chlorine, bromine, and iodine, and wherein $R_1$ and $R_2$ may couple with each other to form a ring. Particularly, compounds asymmetrical with respect to the central axis 1 are effective.

In the present invention, the vinylene carbonate was added into the electrolytic solution, and then a positive electrode, a negative electrode, and a separator were sealed into a sealed container using this electrolytic solution, and then required leads, packing, and the like were attached to the sealed container to form a lithium battery. Electron microscopic observation confirmed that when this lithium battery is initializing-charged, the vinylene carbonate reacts with the negative electrode active material, and a coating made of a hardly soluble compound derived from the vinylene carbonate is formed on the surface of the negative electrode active material. For the formation of this coating, when the vinylene carbonate and the carboxylic anhydride compound are added, a compound coating derived from the mixture of the above-described two additives is formed.

In the present invention, the properties of the compound that is hardly soluble in the nonaqueous electrolytic solution formed on the surface of the negative electrode active material have not been clarified, however, the observation with an electron microscope confirmed that a very thin coating is formed on the surface of the negative electrode active material.

Examples of the positive electrode active material used in the present invention that reversibly occlude and release lithium include layered compounds, such as cobalt anhydride ($LiCoO_2$) and lithium nickel oxide ($LiNiO_2$), or a compound with one or more kinds of transition metal substituents. Moreover, examples of the positive electrode active material further include lithium manganese oxides $Li_{1+x}Mn_2-xO_4$ (where, x=0–0.33), $Li_{1+x}Mn_{2-x-y}M_yO_4$ (where, M contains at least one kind of metal selected from Ni, Co, Fe, Cu, Al, and Mg, x=0–0.33, y=0–1.0, and 2−x−y>0), LiIMnO$_4$, LiMn$_2$O$_4$, LiMnO$_2$, LiMn$_{2-x}$O$_2$ (where, M contains at least one kind of metal selected from Ni, Co, Fe, Cu, Al, and Mg, x=0.01–0.1), and Li$_2$Mn$_3$MO$_8$ (where, M contains at least one kind of metal selected from Ni, Co, Fe, and Cu), or a lithium copper oxide (Li$_2$CuO$_2$). Furthermore, a disulfide compound, a mixture containing Fe$_2$(MoO$_4$)$_3$ or the like, and one kind or two or more kinds of poly aniline, polypyrrole, and polythiophene are enumerated.

Furthermore, a compound with vinylene carbonate or carboxylic anhydride group, a compound with sulfur elements such as propane sultone, or a compound with boron may be mixed into the electrolytic solution as the third component other than the solvent and the solute. Also in mixing, two or more kinds of compounds other than the solvent and the solute may be mixed. The purposes of addition of these compounds include the inhibition of MN elution from the positive electrode material, the improvement of the ion conductivity of the electrolytic solution, the fireproofing, flame proofing, and the like of the electrolytic solution, other than the inhibition of reductive decomposition on the surface of the negative electrode. These compounds are selected depending on the above-described purposes.

Moreover, the examples of the negative electrode active material that reversibly occludes and releases lithium include natural graphite, and an easily graphitizable material treated at high temperature not lower than 2500° C., the easily graphitizable material being obtained from petroleum coke, coal pitch coke, and the like. Moreover, the examples of the negative electrode active material include a mesophase carbon, or an amorphous carbon, graphite whose surface is coated with an amorphous carbon, or a carbon material of a natural or artificial graphite, the crystallizability on the surface of which is reduced by a mechanical treatment.

Other than the above-described ones, a carbon fiber, a lithium metal, a metal to be alloyed with lithium, a material such as a silicon or carbon particle supporting a metal on its surface are used. Examples of the carbon material supporting a metal include a metal selected from lithium, aluminium, tin, silicon, indium, gallium, and magnesium, or an alloy thereof. Moreover, a relevant metal or the oxide of this metal can be utilized as the negative electrode active material. Among these negative electrode candidate materials, even two or more kinds can be mixed and used.

Moreover, the nonaqueous electrolytic solutions used in the present invention refer to cyclic carbonates, chain carbonates, straight chain carboxylates, lactones, cyclic ethers, and chain esters. One kind or two or more kinds of these solvents are mixed and used as the solvent, and a lithium salt is dissolved in the solvent as the solute.

Specific examples of the nonaqueous solvent include ethylene carbonate, propylene carbonate, gamma butyrolactone, dimethyl carbonate, ethylmethyl carbonate, and diethyl carbonate. Moreover, halides, such as a fluorine substitution product of these solvents, and these solvents with a sulfur substituent can be also used. These solvents may be used alone, or two or more kinds may be mixed and used, however, usually, a mixed solvent system of a solvent with a large viscosity, such as cyclic carbonate or cyclic lactone, and the one with a small viscosity, such as chain carbonate or chain ester, is preferable.

Specific examples of the lithium salt serving as the solute include lithium salts, such as LiPF$_6$, LiBF$_4$, LiClO$_4$, LiAsF$_6$, LiSbF$_6$, LiAlCl$_4$, LiCF$_3$SO$_3$, Li(CF$_3$SO$_2$)$_2$N, and Li(C$_2$F$_5$SO$_2$)$_2$N, while LiPF$_6$ and LiBF$_4$ are suitable among these. Moreover, these lithium salts may be used alone, or two or more kinds may be mixed and used.

Furthermore, as the carboxylic anhydride compound mixed into the electrolytic solution, itaconic anhydride, citraconic anhydride, dodecenyl succinic anhydride, lionlenic acid adduct of maleic anhydride, maleic anhydride adduct of methyl cyclopentadiene, chlorendic anhydride, alkylated alkylene tetrahydrophtal anhydride, methyl 2-substituted butenyl tetrahydrophthalic anhydride, methyltetrahydrophthalic anhydride, methyl himic anhydride, trialkyltetrahydrophthalic anhydride, methylcyclohexenedicarboxylic anhydride, phthalic anhydride, trimellitic anhydride, pyromellitic dianhydride, benzophenonetetracarboxylic anhydride, ethylene glycol bis tri-mellitate, glycerol tris-trimellitate, HET anhydride, tetrabromophthalic anhydride, and like are preferable.

The action mechanism of carboxylic anhydride is not clear, however, the compound with a carboxylic anhydride compound used in the present invention may serve as a polymer insoluble in the electrolytic solution and produce a coating on the carbon negative electrode in the initial cycle. Moreover, using a compound with a carbon-carbon double bond, a lithium battery more excellent in storage characteristics can be obtained because the compound drives the polymerization reaction more rapidly. Furthermore, when the carboxylic anhydride is an asymmetrical compound, the reduction product thereof also has stereoregularity, which might enable a molecular level interface control and produce a tighter coating than when the vinylene carbonate described in Patent Document 1 is used. This tight coating might improve the coatability of the surface of the negative electrode, thereby providing a lithium battery having excellent high-temperature storage characteristics.

In the present invention, the lithium secondary battery is prepared as follows. First, a positive electrode material is mixed with a conductive material of a carbon material powder together with a binder such as polyvinylidene fluoride (PVDF) to prepare a slurry. The mixing ratio of the conductive material with respect to the positive electrode active material is preferably in a range of 5 to 20 wt %. In this case, sufficient kneading is carried out using a mixer provided with a stirrer such as a rotor blade so that the powder particles of the positive electrode active material may disperse in the slurry uniformly. The sufficiently mixed slurry is applied to both sides of an aluminium foil of 15-25 μm thickness using a roll transfer coater, for example. After applying the slurry to both sides, the resultant aluminum foil was pressed and dried to form an electrode plate of the positive electrode. Here, the thickness of the applied electrode mixture is preferably in a range of 20 to 110 μm.

For the negative electrode, graphite or amorphous carbon, or a mixture thereof is used as the active material, and as in the positive electrode this active material is mixed with a binder, and then applied, pressed, and dried to form the electrode. The thickness of the electrode mixture is preferably in a range of 20 to 110 μm. In the case of the negative electrode, a copper foil of 7-20 μm thickness is used as the current collector. The mixing ratio in coating is preferably in a range of 90:10 to 98:2 at the weight ratio between the negative electrode active material and the binder, for example.

The coated electrode is cut into a predetermined length, and then a current drawing tab portion is prepared by spot welding or ultrasonic welding. The tab portion comprises a metallic foil of the same quality of the material as that of the rectangular-shaped current collector, and is prepared in order to draw current from the electrode. Between the tabbed electrodes, a separator comprising, for example, polyethylene (PE), polypropylene (PP), or the like is sandwiched and laminated, and these are cylindrically rolled up to serve as a group of electrodes, which is then houses into a cylindrical container. Or, as the separator, a bag-shaped one may be used to house each of the positive and negative electrodes thereinside, respectively, and these resultant bag-shaped separators may be sequentially laminated in the order from the positive electrode to the negative electrode and housed into a square-shaped container. As the material of the container, stainless steel or aluminium is preferably used.

After housing the group of electrodes into the battery container, an electrolytic solution is injected and sealed. As the electrolytic solution, the one produced by dissolving $LiPF_6$ or $LiBF_4$ as the electrolyte into a solvent, such as ethylene carbonate (EC), propylene carbonate (PC), dimethyl carbonate (DMC), is preferably used. The concentration of the electrolyte is preferably in a range of 0.6 M to 1.2 M. The electrolytic solution is poured, and then the battery container is sealed to complete a battery.

The embodiment of the invention is described below. Hereinafter, using examples and comparative examples of the present invention, the present invention will be further described taking specific examples, but the present invention is not limited to these examples.

EXAMPLE 1

A lithium secondary battery according to the present invention was prepared as follows. As the positive electrode active material, $Li_{1.02}Mn_{1.98}Al_{0.02}O_4$ with the average particle size of 10 μm and the specific surface area of 1.5 m²/g was used as the spinel-based lithium manganese oxide. 90 wt % of a positive electrode active material and 10 wt % of a mixture (9:2) of massive graphite and acetylene black were dry blended.

Next, as the binder, N-methyl-2-pyrrolidone, into which polyvinylidene fluoride that was adjusted in advance so that the positive electrode active material may become 5 wt % is dissolved, was dispersed into the obtained mixture to prepare a paste. The mixing ratio of the active material, the conductive material, and PVDF was set to 90:5:5 at the weight ratio.

This slurry was applied to an aluminium foil (positive electrode current collector) of 20 μm thickness substantially uniformly and equally. After coating, this aluminium foil was dried at temperature of 80° C., and then the slurry was applied to both sides of the aluminium foil and dried using the same procedure. Subsequently, the aluminium foil was compression molded using a roll press machine, and a lead piece made of aluminium foil for drawing current was welded to prepare a positive plate. Moreover, the negative electrode was prepared using the following method. As the electrode active material, natural graphite and an NMP solution of the negative electrode active material and PVDF were mixed, and the sufficiently kneaded one was used as the negative electrode slurry. The mixing ratio of the negative electrode active material and PVDF was set to 90:10 at the weight ratio. This slurry was applied to both sides of a rolled copper foil (negative electrode current collector) of 10 μm thickness substantially uniformly and equally.

The slurry was applied to both sides of the rolled copper foil and dried using the same procedure as in the positive electrode. Subsequently, this rolled copper foil was compression molded using a roll press machine, and a lead piece was welded to prepare a negative plate.

Using the prepared positive plate and negative electrode plate, a cylindrical battery schematically shown in FIG. 1 was prepared. The prepared positive plate 1 and negative electrode plate 2 were rolled up with a separator 3 sandwiched therebetween so that these plates may not directly contact to each other, thereby preparing a group of electrodes. In this case, a lead piece 4 of the positive plate and a lead piece 5 of the negative electrode plate were adapted to be located on both opposite end faces of the group of electrodes. Furthermore, a mixture coated portion of the positive electrode was adapted so as not to protrude from a mixture coated portion of the negative electrode.

A microporous polypropylene film of 30 μm thickness was used as the separator. These group of electrodes were inserted in a battery can 6 made of stainless steel, and the negative electrode piece 5 was welded to the can bottom, and the positive electrode piece 4 was welded to a sealing lid portion 7 serving also as a positive-electrode current terminal. Each of electrolytic solutions for the lithium secondary battery described in Embodiment 3 is injected, and then the sealing lid portion 7, to which the positive electrode terminal is attached, was crimped to the battery can 6 via the packing 8 and sealed, thereby preparing a cylindrical battery of 40 mm diameter and 110 mm height. In this case, the ratio of the cross-section area of a group of windings to the cross-section area of the battery was 95%. Note that, there is provided a relief valve which, when the pressure inside the battery increases, will open and release the pressure inside the battery. Moreover, reference numeral 9 represents an insulating plate. The electrolytic solution was poured to prepare a lithium secondary battery, and a storage test was conducted. $LiPF_6$ was dissolved as the lithium salt into a solution, wherein ethylene carbonate (EC) and ethylmethyl carbonate (EMC) are mixed so as to be 1:2 at the volume ratio, so as to achieve a concentration of 1M, and the thus obtained solution was used as the electrolytic solution.

At 25° C., the battery was charged under the constant current and constant voltage conditions of a charging current 1 CA and a constant voltage 4.2 V, while in discharging, the battery was discharged to a battery voltage 2.7 V under the constant current condition of a discharging current 1 CA. 1 CA is a current value capable of discharging a reversible discharge capacity in 1 hour, the reversible discharge capacity being obtained from a battery design table.

These charge and discharge processes were defined as one cycle, and two times of charging and discharging cycles were implemented (hereinafter, this pretreatment process is referred to as initialization). The initialized battery was further charged under the constant current and constant voltage conditions of 4.2 V, 1 CA for 5 hours so that the battery voltage becomes 4.2 V, and then a battery storage test was conducted at 50° C. For the discharge capacity retention, the residual discharge capacity after the storage test was measured, and afterward two cycles of charge and discharge were carried out again and the discharge capacity at this second cycle was expressed as a relative value, with the discharge capacity at the second cycle during the initialization defined as 100.

EXAMPLES 2 to 7

Except that 1 M of $LiPF_6$ was added into the electrolytic solution and 0.1 g to 1.2 g of vinylene carbonate was mixed into an EC/EMC=½ solution, a lithium secondary battery was prepared as in Example 1.

EXAMPLE 8

Except that 1 M of $LiPF_6$ was added into the electrolytic solution and 1.0 g of vinylene carbonate was mixed into the EC/EMC=½ solution and also 1.0 g of tetramethyl hydronalium carboxylic anhydride was added, a lithium secondary battery was prepared as in Example 1.

Table 1 shows the additive amount, the power density after a 60-day storage test when the initial energy of the respective batteries described in Examples 1 to 8 is defined as 100. This table reveals that when vinylene carbonate was added in a range of 0.3 g-0.6 g as the additive amount as in the present invention, a decrease in the power density can be suppressed more than when the amount of less than 0.3 g or greater than 0.61 g was added. Furthermore, the same effect can be found also by adding a carboxylic anhydride compound. In Table 1, the initial power density is the power density at the time of the first initializing charging of the obtained lithium battery.

TABLE 1

| Unit | Additive amount g | Additive amount of carboxylic anhydride (g) g | Initial power density Wh/Kg | Power density after 60 days (initial ratio) % |
|---|---|---|---|---|
| Example 1 | 0 | 0 | 110 | 58 |
| Example 2 | 0.1 | 0 | 113 | 60 |
| Example 3 | 0.3 | 0 | 114 | 62 |
| Example 4 | 0.5 | 0 | 115 | 63 |
| Example 5 | 0.6 | 0 | 114 | 63 |
| Example 6 | 1.0 | 0 | 110 | 61 |
| Example 7 | 1.2 | 0 | 105 | 62 |
| Example 8 | 0.5 | 0.5 | 113 | 63 |

The vinylene carbonate or carboxylic anhydrides is subjected to reductive decomposition on the electrode surface during the initial charge process and forms a coating on the electrode surface, however, with the addition of less than 0.3 g this coating effect may not be sufficient, and in contrast with the additive amount exceeding 0.61 g the coating effect may be too high. Moreover, if the battery volume increases by X times from the size of the battery as in this example, the weight and the like of the constituted positive electrode material, negative electrode material, and electrolytic solution might also increase by X times, and therefore the optimum additive amount might also increase by X times. Furthermore, the above-described test results are when the present battery is a cylindrical-type battery, but the same effect may be found in a flat spirally-wound type battery, a laminate type battery, and the like, regardless of the battery shape.

Advantages of the Invention

According to the present invention, a lithium secondary battery excellent in storage characteristics can be obtained. Moreover, the produced form of the protective coating of the negative electrode surface can be controlled by selecting the amount and composition of the additives.

The invention claimed is:

1. A nonaqueous lithium battery comprising:
a positive electrode active material comprising a lithium-containing oxide capable of inserting and detaching lithium ions;
a negative electrode active material comprising a carbon material capable of inserting and detaching lithium ions;
a negative electrode conductive material; and
a nonaqueous electrolytic solution containing lithium ions,
wherein a coating of a compound derived from vinylene carbonate is formed on a surface of the negative electrode active material after initializing charging,
wherein a battery capacity of the lithium battery is not greater than 10 Ah, and
wherein an amount of the negative electrode active material is A, an amount of the negative electrode conductive material is B, a specific surface area of the negative electrode active material is X (m²/g), a specific surface area of the negative electrode conductive material is Y (m²/g), and an additive amount C (g/m²) of vinylene carbonate is in a range calculated from an equation:

$$0.0058 \leq \frac{C(g)}{(A \cdot X + B \cdot Y)(m^2)} \leq 0.0115.$$ Equation (1)

2. The nonaqueous lithium battery according to claim 1, wherein a weight power density of the lithium battery is no less than 100 Wh/kg.

3. The nonaqueous lithium battery according to claim 2, wherein the coating further contains a compound derived from an organic compound having a carboxylic anhydride group.

4. The nonaqueous lithium battery according to claim 1, wherein the coating further contains a compound derived from an organic compound having a carboxylic anhydride group.

5. The nonaqueous lithium battery according to claim 4, wherein the organic compound having the carboxylic anhydride group has a molecular structure asymmetrical with respect to a symmetric axis 1 in Formula (1), wherein $R_1$ and $R_2$ in Formula (1) may couple with each other to form a ring and are organic groups whose carbon number is in a range of 1 to 20, and $R_1$ and $R_2$ in Formula (1) further contain at least one of hydrogen, sulfur, oxygen, nitrogen, fluorine, chlorine, bromine, and iodine:

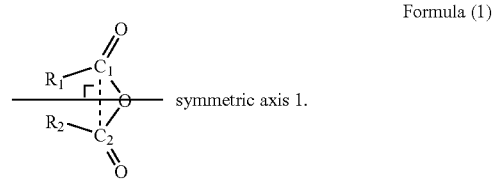

Formula (1)

6. The nonaqueous lithium battery according to claim 4, wherein the additive amount of vinylene carbonate is in a range of 0.3-0.6 g/100 g (electrolytic solution mass), and wherein an additive amount of the organic compound having a carboxylic anhydride group is in a range of 0.3-0.6 g/100 g (electrolytic solution mass).

7. The nonaqueous lithium battery according to claim 1, wherein the additive amount of vinylene carbonate is in a range of 0.3-0.6 g/100 g (electrolytic solution mass).

8. A method of producing a nonaqueous lithium battery comprising a step of sealing a positive electrode active material comprising a lithium-containing oxide capable of inserting and detaching lithium ions, a negative electrode active material comprising a carbon material capable of inserting and detaching lithium ions, a negative electrode conductive material, and a nonaqueous electrolytic solution containing lithium ions, using a sealed container to constitute a lithium battery,
wherein after adding an amount of vinylene carbonate into the nonaqueous electrolytic solution and constituting the lithium battery, initializing charging to form a coating on a surface of the negative electrode active material, the coating being derived from vinylene carbonate,
wherein a battery capacity of the lithium battery is not greater than 10 Ah, and wherein an amount of the negative electrode active material is A, an amount of the negative electrode conductive material is B, a specific surface area of the negative electrode active material is X ($m^2/g$), a specific surface area of the negative electrode conductive material is Y ($m^2/g$), and an additive amount C ($g/m^2$) of vinylene carbonate is in a range calculated from an equation:

$$0.0058 \leq \frac{C(g)}{(A \cdot X + B \cdot Y)(m^2)} \leq 0.0115. \qquad \text{Equation (1)}$$

9. The method of producing a nonaqueous lithium battery according to claim 8, wherein the additive amount of vinylene carbonate is in a range of 3-6 g/100 g (electrolytic solution mass).

10. The method of producing a nonaqueous lithium battery according to claim 8, wherein a weight power density of the lithium battery is no less than 100 Wh/kg.

11. The method of producing a nonaqueous lithium battery according to claim 8, wherein the additive amount of vinylene carbonate is in a range of 0.3-0.6 g/100 g (electrolytic solution mass).

12. The method of producing a nonaqueous lithium battery according to claim 8, further comprising adding an amount of an organic compound having a carboxylic anhydride group into the nonaqueous electrolytic solution, wherein after adding the amount of vinylene carbonate and the amount of the organic compound having a carboxylic anhydride group into the nonaqueous electrolytic solution and constituting the lithium battery, initializing charging to form a coating on a surface of the negative electrode active material, the coating being derived from vinylene carbonate and the organic compound having a carboxylic anhydride group.

13. A nonaqueous lithium battery comprising:
a positive electrode active material comprising a lithium-containing oxide capable of inserting and detaching lithium ions;
a negative electrode active material comprising a carbon material capable of inserting and detaching lithium ions;
a negative electrode conductive material; and
a nonaqueous electrolytic solution containing lithium ions and an additive mixture of vinylene carbonate and an organic compound having a carboxylic anhydride group,
wherein a coating derived from the additive mixture of vinylene carbonate and the organic compound having a carboxylic anhydride group is formed on a surface of the negative electrode active material after initializing charging,
wherein a battery capacity of the lithium battery is not greater than 10 Ah and
wherein an amount of the negative electrode active material is A, an amount of the negative electrode conductive material is B, a specific surface area of the negative electrode active material is X ($m^2/g$), a specific surface area of the negative electrode conductive material is Y ($m^2/g$), and an additive amount C ($g/m^2$) of vinylene carbonate is in a range calculated from an equation:

$$0.0058 \leq \frac{C(g)}{(A \cdot X + B \cdot Y)(m^2)} \leq 0.0115. \qquad \text{Equation (1)}$$

* * * * *